United States Patent
Yoon et al.

(10) Patent No.: US 10,613,360 B2
(45) Date of Patent: Apr. 7, 2020

(54) LIQUID CRYSTAL DISPLAY DEVICE

(71) Applicant: LG DISPLAY CO., LTD., Seoul (KR)

(72) Inventors: Yong-Joong Yoon, Paju-si (KR); Jae-Jung Han, Seoul (KR); Se-Min Lee, Seoul (KR); Dae-Yong Kim, Goyang-si (KR); Seung-Ju Gwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/840,615

(22) Filed: Dec. 13, 2017

(65) Prior Publication Data

US 2018/0164615 A1    Jun. 14, 2018

Related U.S. Application Data

(60) Provisional application No. 62/433,516, filed on Dec. 13, 2016.

(51) Int. Cl.
    *G02F 1/13*     (2006.01)
    *G02F 1/1343*   (2006.01)
    *G02F 1/137*    (2006.01)
    *G02F 1/1334*   (2006.01)
    *G02F 1/1335*   (2006.01)

(52) U.S. Cl.
    CPC ............ *G02F 1/1323* (2013.01); *G02F 1/137* (2013.01); *G02F 1/1334* (2013.01); *G02F 1/133524* (2013.01); *G02F 1/134309* (2013.01)

(58) Field of Classification Search
    CPC ............ G02F 1/1323; G02F 1/133524; G02F 1/1334; G02F 1/137
    See application file for complete search history.

(56) References Cited

U.S. PATENT DOCUMENTS

| | | | |
|---|---|---|---|
| 2007/0030240 A1* | 2/2007 | Sumiyoshi | G02F 1/1323 345/102 |
| 2008/0258995 A1* | 10/2008 | Vissenberg | B60K 35/00 345/1.1 |
| 2014/0104521 A1* | 4/2014 | Nishimura | G02F 1/13306 349/33 |
| 2017/0116937 A1* | 4/2017 | Du | G02F 1/1323 |

* cited by examiner

*Primary Examiner* — Jessica M Merlin
(74) *Attorney, Agent, or Firm* — Birch, Stewart, Kolasch & Birch, LLP

(57) ABSTRACT

A liquid crystal display device according to an embodiment includes a liquid crystal panel including a plurality of display regions arranged in a first axis direction; a backlight unit below the liquid crystal panel; and a viewing angle adjustment unit between the liquid crystal panel and the backlight unit, wherein the viewing angle adjustment unit includes a viewing angle adjustment sheet that includes a plurality of division regions corresponding to the plurality of display regions, respectively, and the plurality of division regions are individually adjusted in scattering rate according to ON and OFF operation modes.

13 Claims, 6 Drawing Sheets

| | driver position | passenger position |
|---|---|---|
| while driving |  D2,A2(ON) / D1,A1(OFF) |  |
| while stopping |  D2,A2(OFF) / D1,A1(OFF) |  |

LIQUID CRYSTAL DISPLAY DEVICE

CROSS-REFERENCE TO RELATED APPLICATIONS

The present application claims the priority benefit of U.S. Patent Provisional Application No. 62/433,516 filed on Dec. 13, 2016, which is hereby incorporated by reference in its entirety for all purposes as if fully set forth herein.

BACKGROUND OF THE INVENTION

Field of the Invention

The present invention relates to a liquid crystal display device.

Discussion of the Related Art

Facing information society, needs for display devices have increased variously. Recently, flat display devices, such as a liquid crystal display (LCD) device, a plasma display panel (PDP) device, and an organic light emitting diode (OLED) display device, are used.

Among these display devices, LCD devices are widely used because of advantages in a lightweight, a thin profile, a low power consumption and the like.

Recently, the LCD device has been used as an information display device for a vehicle. For example, the LCD device is used as an instrument panel in front of a driver, or is installed in a center fascia and is used as a center information display (CID), or is installed in a dash board in front of a passenger and is used as an ambient information display (AID).

The CID or AID has display regions divided therein and simultaneously displays various information images through the respective display regions. For example, an information image, such as a navigation image, needed for a driving, and an image for a passenger, such as a moving image, are displayed together.

However, since the related art LCD device does not have a function of individually adjusting viewing angles by each display region, a driver while driving may see an image intended for a passenger, and this serves as a dangerous factor.

SUMMARY OF THE INVENTION

Accordingly, the present invention is directed to an LCD device that substantially obviates one or more of the problems due to limitations and disadvantages of the related art.

An object of the present invention is to provide an LCD device that can individually adjust viewing angles by each display region.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a liquid crystal panel including a plurality of display regions arranged in a first axis direction; a backlight unit below the liquid crystal panel; and a viewing angle adjustment unit between the liquid crystal panel and the backlight unit, wherein the viewing angle adjustment unit includes a viewing angle adjustment sheet that includes a plurality of division regions corresponding to the plurality of display regions, respectively, and the plurality of division regions are individually adjusted in scattering rate according to ON and OFF operation modes.

In another aspect, a liquid crystal display device includes a liquid crystal panel including a plurality of display regions arranged in a first axis direction; a backlight unit below the liquid crystal panel; and a viewing angle adjustment unit between the liquid crystal panel and the backlight unit, wherein the viewing angle adjustment unit includes a viewing angle adjustment sheet that includes a plurality of division regions corresponding to the plurality of display regions, respectively, and that includes a liquid crystal layer including liquid crystal molecules dispersed in a polymer matrix, and first and second driving electrodes between which the liquid crystal layer is located, and wherein at least one of the first and second driving electrodes includes a plurality of division electrodes corresponding to the plurality of division regions, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to exemplary embodiments, examples of which are illustrated in the accompanying drawings. The same reference numbers may be used throughout the drawings to refer to the same or like parts.

In the embodiments below, an LCD device applied to a CID installed in a center fascia of a vehicle or an AID installed in a dash board of a vehicle in front of a passenger may be explained by way of example. All the components of the LCD device according to all embodiments of the present invention are operatively coupled and configured.

Figure 1:
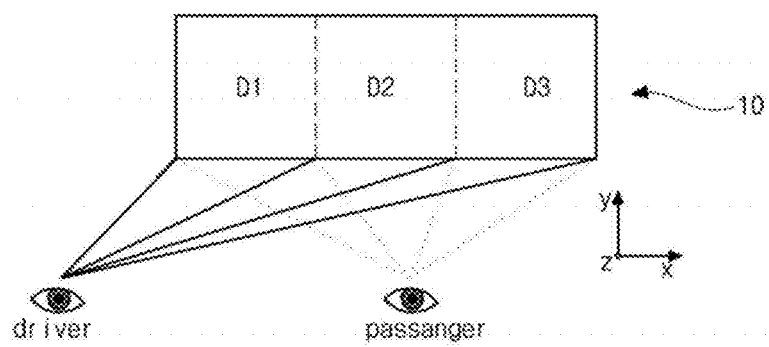
FIGS. 1 and 2 are a plan view and a cross-sectional view, respectively, illustrating an LCD device according to an embodiment of the present invention.
Figure 2:
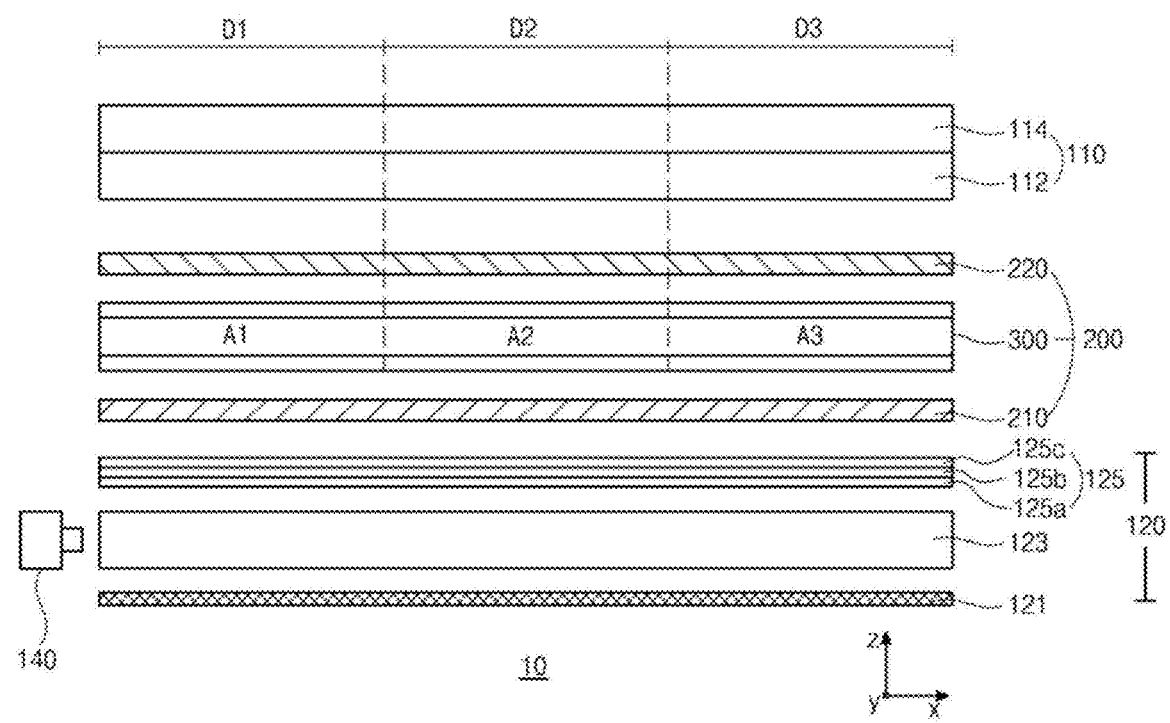

FIGS. 1 and 2 are a plan view and a cross-sectional view, respectively, illustrating an LCD device 10 according to an embodiment of the present invention.

Referring to FIGS. 1 and 2, the LCD device 10 may be used as an information display device installed in a vehicle.

The LCD device 10 includes a plurality of display regions D1 to D3, which may be arranged along a horizontal direction (or x axis direction) and display different information images. The plurality of display regions D1 to D3 can individually adjust respective viewing angles, and thus information images visible to a driver can be selected and individually controlled.

The LCD device 10 may include a liquid crystal panel 110 as a display panel, a backlight unit 120 below the liquid crystal panel 110, and a viewing angle adjustment unit 200 between the liquid crystal panel 110 and the backlight unit 120.

The LCD device 10 may include structural components, for example, a guide panel, a top case and a bottom cover to be coupled with and modulize the liquid crystal panel 110, the backlight unit 120 and the viewing angle adjustment unit 200.

The guide panel surrounds sides of the liquid crystal panel 110, the backlight unit 120 and the viewing angle adjustment unit 200, and has a rectangular frame shape. The liquid crystal panel 110 may be placed on the guide panel, and may be attached to a top surface of the guide panel using an adhesive member such as a double-sided adhesive tape.

The bottom cover protects and supports a bottom surface of the backlight unit 120. The bottom cover may include a base portion which the backlight unit 120 is placed on, and side wall portions bent upward from edges of the base portion. The backlight unit 120 and the viewing angle adjustment unit 200 may be placed in an inner space defined by the base portion and the side wall portions.

The top case has a rectangular frame shape, and covers edge portions of the liquid crystal panel 110.

The liquid crystal panel 110, the backlight unit 120 and the viewing angle adjustment unit 200 may be modulized by the guide panel, the bottom cover, and the top case.

The liquid crystal panel 110 is a component to display images, and includes first and second substrates 112 and 114 facing each other, and a liquid crystal layer therebetween.

On an inner surface of the first substrate 112 that may be referred to as a lower substrate or an array substrate, gate lines and data lines cross each other to define pixels, and a thin film transistor connected to the corresponding gate and data lines and a pixel electrode connected to the thin film transistor are formed in each pixel.

On an inner surface of the second substrate 114 that may be referred to as an upper substrate or a color filter substrate, a color filter pattern corresponding to each pixel and a black matrix surrounding the color filter pattern and corresponding to the gate line, the data line and the thin film transistor are formed.

All types of liquid crystal panels may be available as the liquid display panel 110. For example, an IPS type, AH-IPS type, TN type, VA type, or ECB type liquid crystal panel may be used. In case of the IPS type or AH-IPS type, a common electrode to produce an in-plane electric field along with a pixel electrode is formed at the first substrate 112.

Each of the first and second substrates 112 and 114 may include an alignment layer contacting the liquid crystal layer to align liquid crystal molecules of the liquid crystal layer. A seal pattern may be formed between peripheries of the first and second substrates 112 and 114.

Further, a polarization plate may be attached to at least one of the first and second substrates 112 and 114.

A printed circuit board may be connected to at least one side of the liquid crystal panel 110 through a flexible circuit film or the like.

The liquid crystal panel 110 may display different images through the respective display regions D1 to D3. For example, in a state that the LCD device 10 is installed in a vehicle, a screen of the liquid crystal panel 110 may be divided (or logically divided) into the plurality of display regions D1 to D3, for example, first to third display regions D1 to D3 along the horizontal direction, and the first to third display regions D1 to D3 may display different information images.

The backlight unit 120 is a component to supply a backlight to the liquid crystal panel 110. A direct type or side edge type backlight unit may be used as the backlight unit 120. In this embodiment, a side edge type backlight unit 120 is illustrated by way of example.

This backlight unit 120 may include a reflecting plate 121, a light guide plate 123 on the reflecting plate 121, at least one optical films 125 on the light guide plate 123, and light emitting diodes (LEDs) 140 as light sources located corresponding to a side surface of the light guide plate 123.

The reflecting plate 121 may have a white color or silver color for a light reflection. The reflecting plate 121 is located below the light guide plate 123, and functions to reflect a light, that passes through a bottom surface of the light guide plate 123, toward the liquid crystal panel 110 to increase brightness.

A light from the LEDs 140 enters the light guide plate 123 through a light entering surface of the light guide plate 123, then travels in the light guide plate 123 by several total reflections to spread uniformly, and then is output from the light guide plate 123 toward the liquid crystal panel 110.

The backlight unit 120 may include a printed circuit board which the LEDs 140 are mounted and arranged on.

The optical film(s) 125 may be located on the light guide plate 123. When a plurality of optical films 125 are used, by way of example, the optical films 125 may include a diffusion film 125$a$, a prism film 125$b$, and a brightness enhancement film 125$c$ such as a DBEF (dual brightness enhancement film).

The viewing angle adjustment unit 200 processes a light output from the backlight unit 120 while controls an output angle of this light, and supplies this light to the liquid crystal panel 110. Since the viewing angle adjustment unit 200 adjusts a profile of a light supplied to the liquid crystal panel 110, a viewing angle of the LCD device 10 can be adjusted.

In particular, the viewing angle adjustment unit 200 may be divided to include a plurality of division regions A1 to A3, for example, first to third division regions A1 to A3 corresponding to the first to third display regions D1 to D3, respectively. The viewing angle adjustment unit 200 is operated to adjust output light angles by the division regions A1 to A3. Accordingly, each viewing angle may be adjusted by each display region.

The viewing angle adjustment unit 200 may include a first viewing angle control sheet 210, a second viewing angle control unit 220, and a viewing angle adjustment sheet (or viewing angle switching sheet) 300.

The first viewing angle control sheet 210 and the second viewing angle control unit 220 may control viewing angles in directions perpendicular to each other. In this regard, it is defined that: first and second axes perpendicular to each other on a plane (i.e., an xy plane) parallel with a plane of the liquid crystal panel 110 are an x axis and an y axis, respectively, the x axis is parallel with one side of the liquid crystal panel 110, and the y axis is parallel with the one side of the liquid crystal panel 110 and is perpendicular to another side of the liquid crystal panel 110; the x axis is substantially parallel with a ground in a state that the LCD device 10 is installed in a vehicle; and a z axis is vertical to the xy plane, i.e., the plane of the liquid crystal panel 110.

In this case, the first viewing angle control sheet 210 may serve to limit a viewing angle in the x axis direction. In other words, the first viewing angle control sheet 210 may serve to reduce (or narrow) a profile of a light input thereto in the x axis direction. Accordingly, the viewing angle in the x axis direction of the liquid crystal panel 110 becomes narrow.

For this viewing angle control, the first viewing angle control sheet 210 may include a plurality of first viewing angle control patterns (or first louver patterns) that extend along the y axis direction and are parallel with, spaced apart from, each other.

Figure 3:
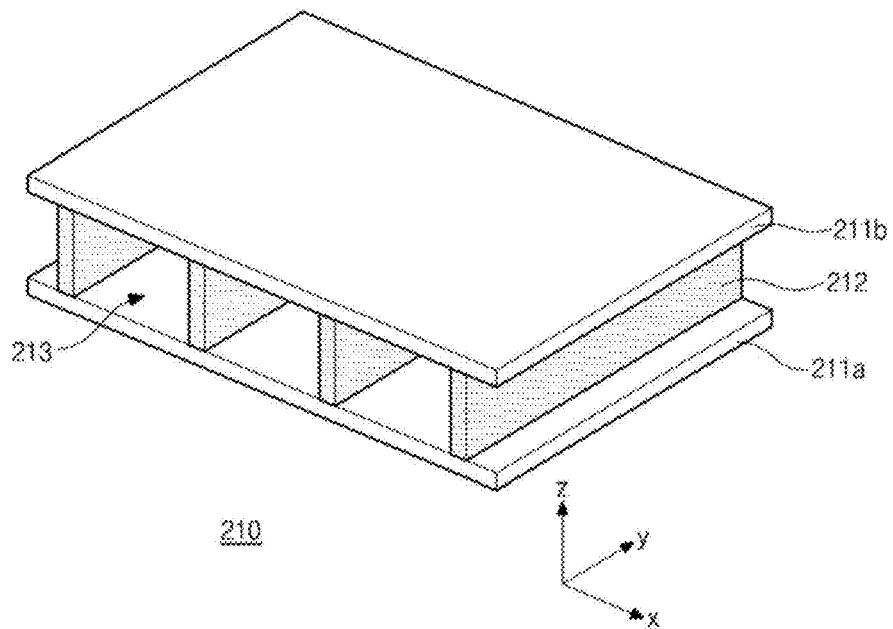
FIG. 3 is a perspective view illustrating a first viewing angle control sheet to an embodiment of the present invention.

In this regard, referring to FIG. 3, the first viewing angle control sheet 210 may include first and second base layers 211*a* and 211*b* facing each other, and the plurality of first viewing angle control patterns 212 that are between the first and second base layers 211*a* and 211*b* and extend along the y axis direction.

The first and second base layers 211*a* and 211*b* may be located at and contact a top and a bottom, respectively, of the first viewing angle control pattern 212, and may support and protect the first viewing angle control pattern 212. The first and second base layers 211*a* and 211*b* may be made of a polymer, for example, PC (polycarbonate).

The first viewing angle control pattern 212 extends along the y axis direction, and serves to block a path of a light incident on a side surface thereof. To do this, the first viewing angle control pattern 212 may have a light absorption property. For example, the first viewing angle control pattern 212 may include a light absorptive material such as black carbon.

By the first viewing angle control pattern 212, an output light angle in the x axis direction perpendicular to the extension direction of the first viewing angle control pattern 212 can be limited.

A region spaced between the neighboring first viewing angle control patterns 212 may be filled with an air or transparent insulating material.

On the contrary to the first viewing angle control sheet 210, the second viewing angle control sheet 220 may serve to limit a viewing angle in the y axis direction.

In other words, the second viewing angle control sheet 220 may serve to reduce (or narrow) a profile of a light input thereto in the y axis direction. Accordingly, the viewing angle in the y axis direction of the liquid crystal panel 110 becomes narrow.

For this viewing angle control, the second viewing angle control sheet 220 may include a plurality of second viewing angle control patterns (or second louver patterns) that extend along the x axis direction and are parallel with, spaced apart from, each other.

Figure 4:
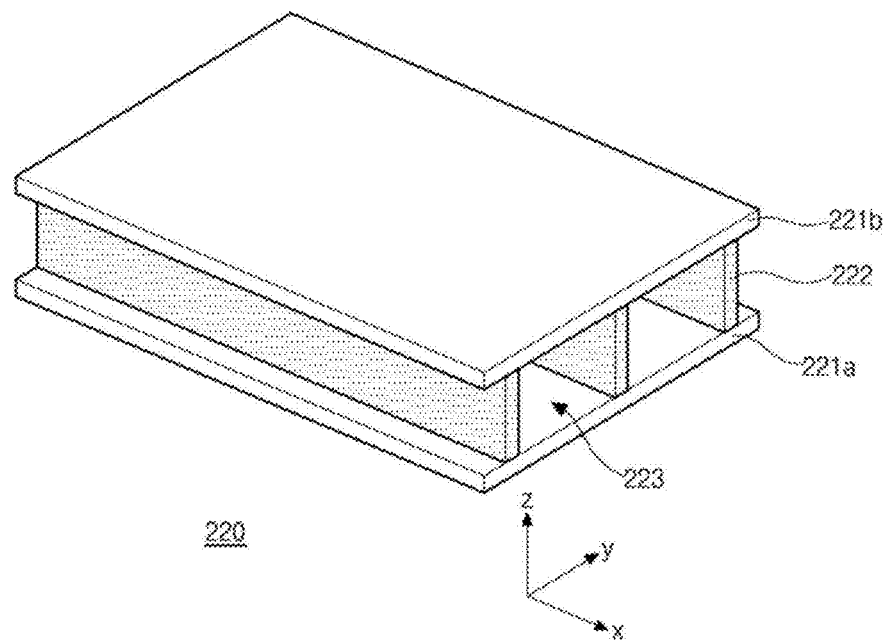
FIG. 4 is a perspective view illustrating a second viewing angle control sheet to an embodiment of the present invention.

In this regard, referring to FIG. 4, the second viewing angle control sheet 220 may include third and fourth base layers 221*a* and 221*b* facing each other, and the plurality of second viewing angle control patterns 222 that are between the third and fourth base layers 221*a* and 221*b* and extend along the x axis direction.

The third and fourth base layers 221*a* and 221*b* may be located at and contact a top and a bottom, respectively, of the second viewing angle control pattern 222, and may support and protect the second viewing angle control pattern 222. The third and fourth base layers 221*a* and 221*b* may be made of a polymer, for example, PC (polycarbonate).

The second viewing angle control pattern 222 extends along the x axis direction, and serves to block a path of a light incident on a side surface thereof. To do this, the second viewing angle control pattern 222 may have a light absorption property. For example, the second viewing angle control pattern 222 may include a light absorptive material such as black carbon.

By the second viewing angle control pattern 222, an output light angle in the y axis direction perpendicular to the extension direction of the second viewing angle control pattern 222 can be limited.

A region spaced between the neighboring second viewing angle control patterns 222 may be filled with an air or transparent insulating material.

As described above, when the first and second viewing angle control sheets 210 and 220 are employed, an output light from the backlight unit 120 is reduced in light profile and thus a light mostly limited in a front direction is supplied to the liquid crystal panel 110. Accordingly, an image is limited in a front direction and displayed at a narrow viewing angle.

By this limitation of the viewing angle, a light reflection on a front glass (i.e., window) or a passenger side glass (i.e., window) of a vehicle can be reduced.

In this regard, in a state that the LCD device 10 is installed in a vehicle with the x axis direction as a horizontal direction, a viewing angle in the horizontal direction becomes narrow due to the first viewing angle control sheet 210, and thus a light incident on a passenger side glass is reduced. Accordingly, an image reflection on a passenger side glass can be reduced.

Further, a viewing angle in the y axis direction, i.e., a vertical direction becomes narrow due to the second viewing angle control sheet 220, and thus a light incident on a front glass is reduced. Accordingly, an image reflection on a front glass can be reduced.

In this embodiment, the viewing angle adjustment sheet 300 is located between the first and second viewing angle control sheets 210 and 220, and serves to maintain or increase (or widen) the viewing angle limited by the first viewing angle control sheet 210 therebelow. In other words, since the first viewing angle control sheet 210 controls the viewing angle in the x axis direction, the viewing angle adjustment sheet 300 serves to adjust the viewing angle in the x axis direction.

Particularly, the viewing angle adjustment sheet 300 may be divided into the plurality of division regions A1 to A3 arranged along the x axis direction, and the division regions A1 to A3 may be individually adjust in viewing angle.

Figure 5:
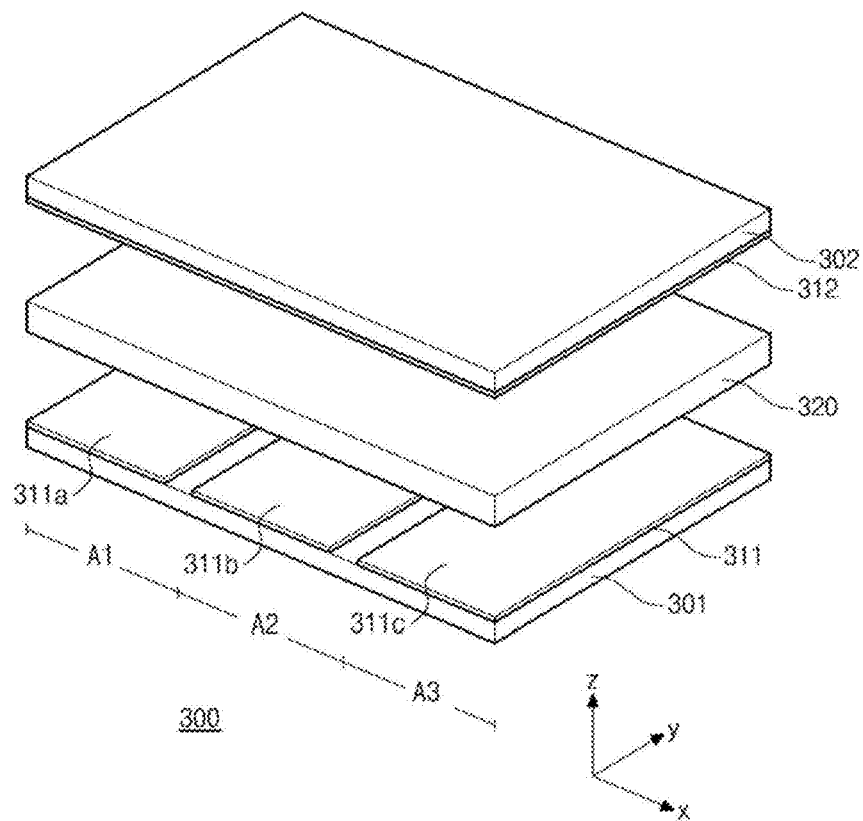
FIGS. 5 and 6 are an exploded perspective view and a cross-sectional view, respectively, of a viewing angle adjustment sheet according to an embodiment of the present invention.
Figure 6:
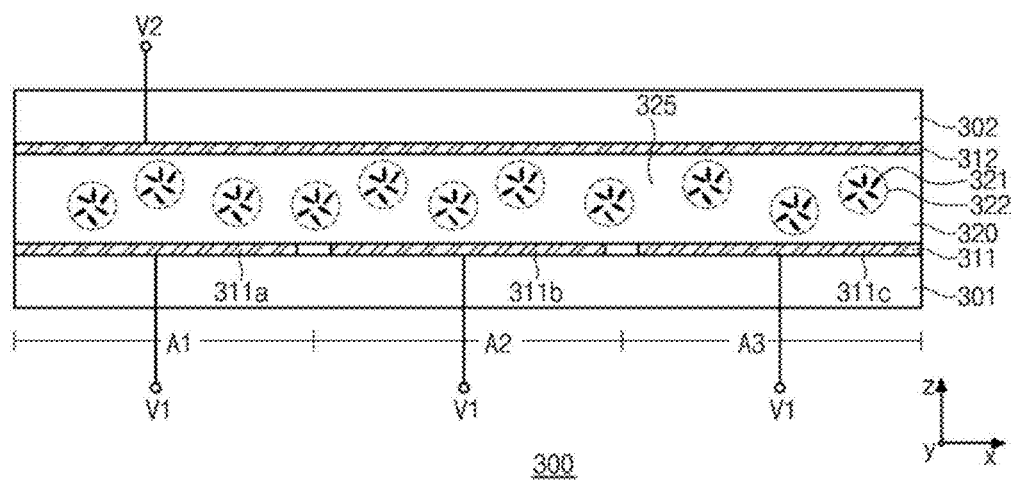

FIGS. 5 and 6 are an exploded perspective view and a cross-sectional view, respectively, of the viewing angle adjustment sheet according to the embodiment of the present invention.

Referring to FIGS. 5 and 6, the viewing angle adjustment sheet 300 may include fifth and sixth base layers 301 and 302 facing each other, first and second driving electrodes 311 and 312 on inner surfaces of the fifth and sixth base layers 301 and 302, respectively, and a liquid crystal layer 320 between the first and second driving electrodes 311 and 312.

The fifth and sixth base layers 301 and 302 may be located on and below the liquid crystal layer 320, respectively, and may support and protect the liquid crystal layer 320. The fifth and sixth base layers 301 and 302 may be made of a polymer, for example, PET (polyethylene terephthalate).

The liquid crystal layer 320 may include a polymer matrix 325, and liquid crystal molecules 321 dispersed in the polymer matrix 325.

The liquid crystal molecules 321 may be randomly arranged in its initial state. When an electric field is applied, the liquid crystal molecules 321 may be aligned along the electric field.

By way of example, the neighboring liquid crystal molecules 321 may form a liquid crystal droplet 322, and a plurality of liquid crystal droplets 322 may be dispersed in the polymer matrix 325.

The first and second driving electrodes 311 and 312 may be applied with respective driving voltages V1 and V2 and produce an electric field therebetween to operate the liquid crystal molecules 321.

For example, when the viewing angle adjustment sheet 300 is operated in an ON mode, the first and second driving voltages V1 and V2 that are different in voltage level are supplied to the first and second driving electrodes 311 and 312, respectively, and an electric field is produced by a voltage difference between the first and second driving voltages V1 and V2 thus the liquid crystal molecules 321 are aligned along a direction of the electric field.

When the liquid crystal molecules 321 is in the aligned state, the viewing angle adjustment sheet 300 substantially has no scattering property, and a light incident on the viewing angle adjustment sheet 300 passes through the viewing angle adjustment sheet 300 substantially without change of a light path.

As such, in the ON operation mode, the viewing angle adjustment sheet 300 has a negligible scattering rate (or a haze value) and substantially serves as a light transmissive optical sheet. Accordingly, the viewing angle limited by the first viewing angle control sheet 210 is maintained.

To the contrary, when the viewing angle adjustment sheet 300 is operated in an OFF operation mode, the first and second driving voltages V1 and V2 are not supplied to the first and second driving electrodes 311 and 312, respectively, and an electric field is not produced between the first and second driving electrodes 311 and 312 thus the liquid crystal molecules 321 are randomly arranged as its initial state.

When the liquid crystal molecules 321 is in the randomly arranged state, the viewing angle adjustment sheet 300 has a scattering property. In other words, the viewing angle adjustment sheet 300 changes in optical property such that it has a predetermined scattering rate (e.g., a haze value of 90%). Accordingly, a light incident on the viewing angle adjustment sheet 300 changes in its path due to the scattering while passing through the viewing angle adjustment sheet 300.

As such, in the OFF operation mode, the viewing angle adjustment sheet 300 serves as an optical sheet having a scattering rate higher than that of the viewing angle adjustment sheet 300 in the ON operation state. Accordingly, the viewing angle limited by the first viewing angle control sheet 210 is widened.

As described above, by adjusting the scattering property of the viewing angle adjustment sheet 300 according to the operation modes, the viewing angle can be switched.

To adjust the viewing angle by each region, at least one of the first and second driving electrodes 311 and 312 may be configured in a division form.

In this regard, in a case that the viewing angle adjustment sheet 300 is sectionalized into the first to third division regions A1 to A3, the first driving electrode 311 may be divided into first to third division electrodes 311a to 311c corresponding to the first to third division regions A1 to A3, respectively. The first to third division electrodes 311a to 311c may be physically divided from each other and be spaced apart from each other, and be individually supplied with the first driving voltage V1.

The second driving electrode 312 may be formed as a single electrode corresponding to all of the first to third division regions A1 to A3.

In this configuration, by switching on/off supplying the first driving voltage V1 to each of the first to third division electrodes 311a to 311c, the viewing angle of each of the first to third division regions A1 to A3 can be independently adjusted.

Figure 7:
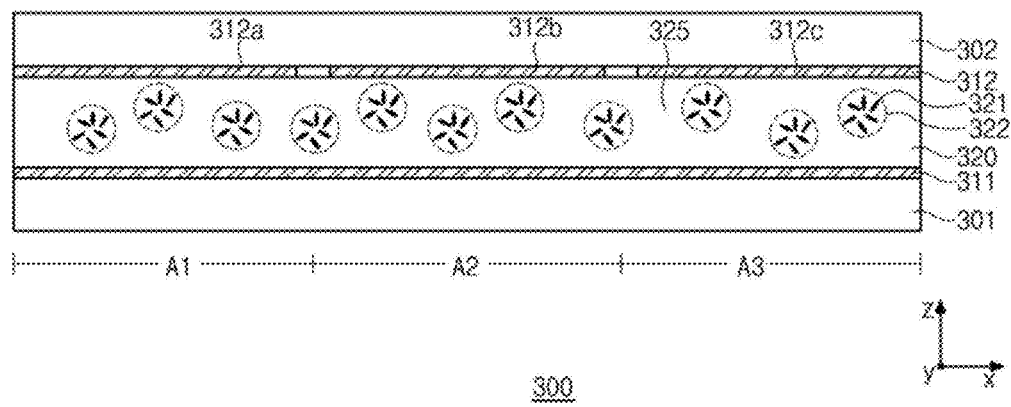
FIGS. 7 and 8 are cross-sectional views illustrating other examples of viewing angle adjustment sheets according to the present invention.

Alternatively, referring to FIG. 7, the first driving electrode 311 may be formed as a single electrode corresponding to all of the first to third division regions A1 to A3, and the second driving electrode 312 may be divided into fourth to sixth division electrodes 312a to 312c corresponding to the first to third division regions A1 to A3, respectively.

In this configuration, by switching on/off supplying the second driving voltage V2 to each of the fourth to sixth division electrodes 312a to 312c, the viewing angle of each of the first to third division regions A1 to A3 can be independently adjusted.

Figure 8:
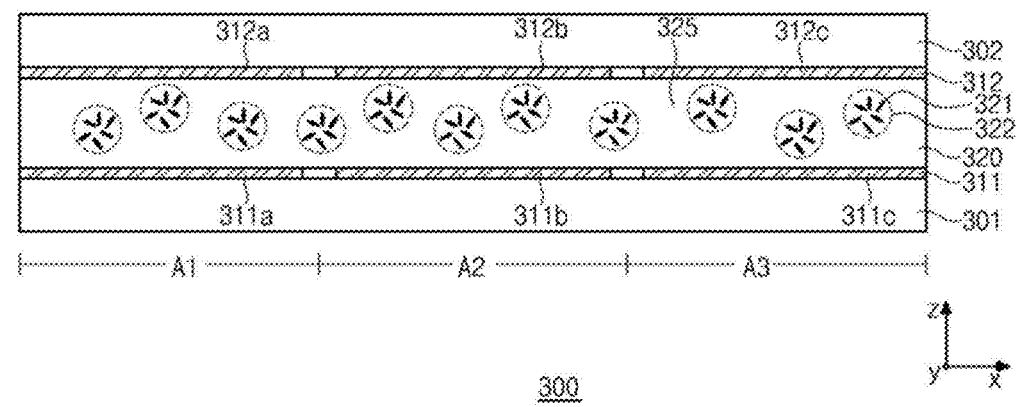

Alternatively, referring to FIG. 8, the first driving electrode 311 may be divided into first to third division electrodes 311a to 311c corresponding to the first to third division regions A1 to A3, respectively, and the second driving electrode 312 may be divided into fourth to sixth division electrodes 312a to 312c corresponding to the first to third division regions A1 to A3, respectively.

In this configuration, by switching on/off supplying the first driving voltage V1 to each of the first to third division electrodes 311a to 311c and switching on/off supplying the second driving voltage V2 to each of the fourth to sixth division electrodes 312a to 312c, the viewing angle of each of the first to third division regions A1 to A3 can be independently adjusted.

To divide the first or second driving electrode 311 or 312, for example, a laser cutting method using a laser radiation may be used.

As described above, in this embodiment, using the viewing angle adjustment sheet 300 in which the operation modes are switched by each division region, the LCD device including the viewing angle adjustment sheet 300 can adjust a viewing angle by each display region.

Accordingly, when information images are displayed through the LCD device 10 as an information display device of a vehicle, a driver's visibility (e.g., driver being able to view) to an information image intended for a passenger can be adjusted according to vehicle operation states. Thus, a dangerous factor while the driver is driving the car or while the car is moving can be removed.

Figure 9:
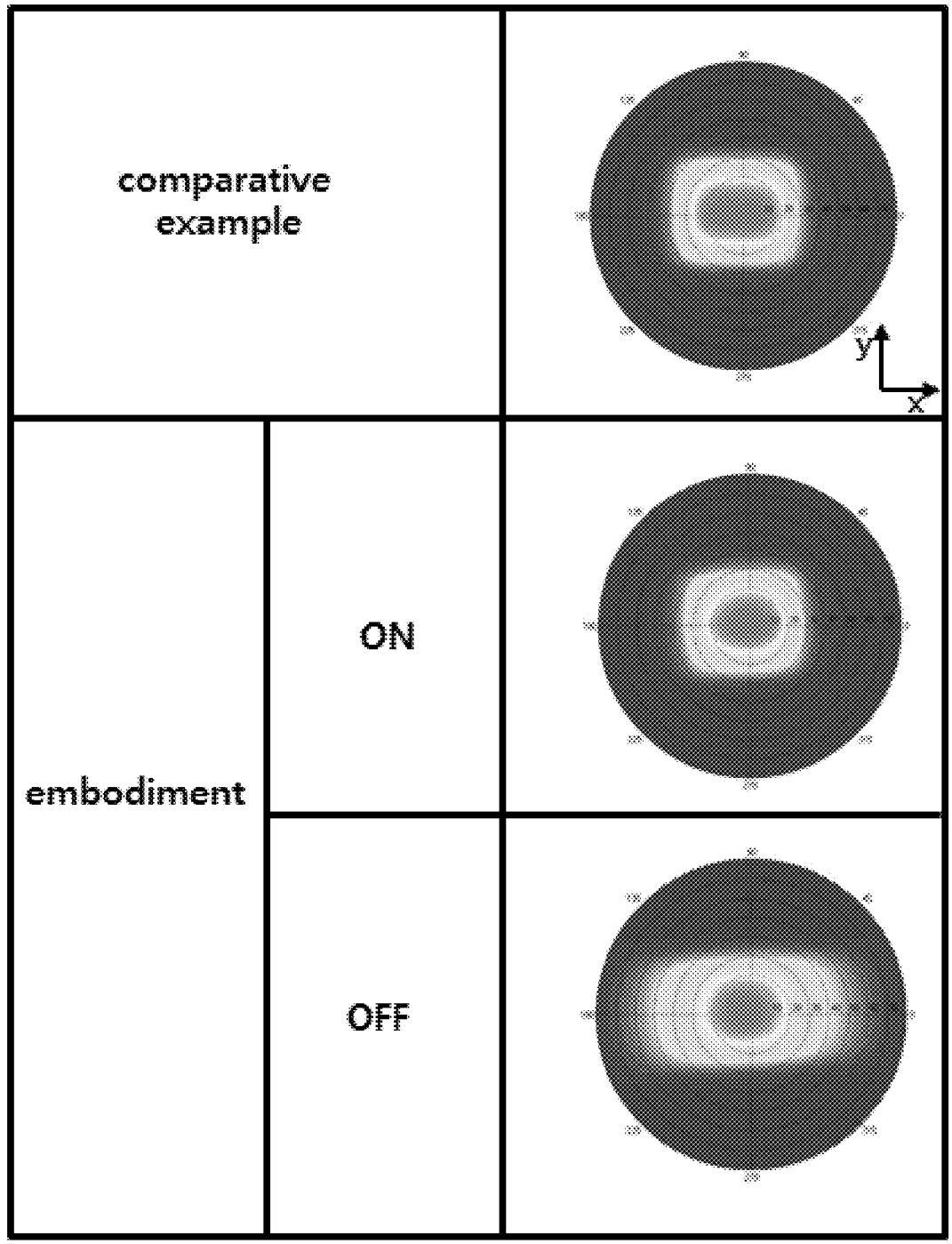
FIG. 9 is a view illustrating simulation results of output profiles of LCD devices of a comparative example and the embodiment of the present invention.
Figure 10:
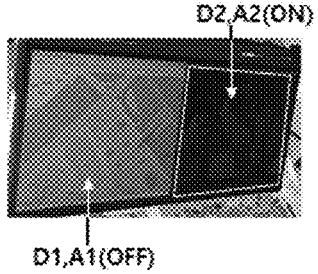
FIG. 10 is a view illustrating images visible to a driver and a passenger when an LCD device of the embodiment of the present invention is used as an information display device of a vehicle.
Figure 10:
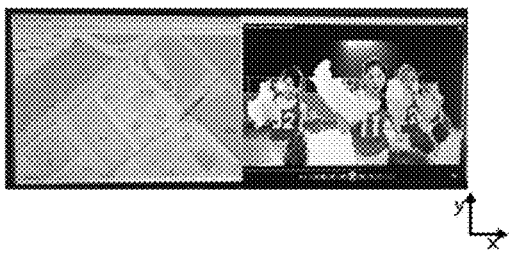
Figure 10:
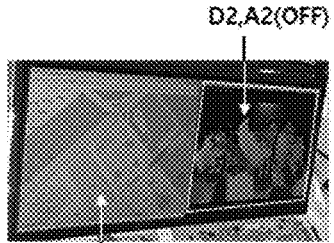
Figure 10:
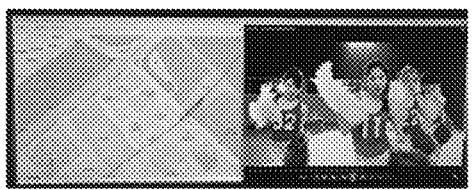

This is explained further with reference to FIGS. 9 and 10.

FIG. 9 is a view illustrating simulation results of output profiles of LCD devices of a comparative example and the embodiment of the present invention, and FIG. 10 is a view illustrating images visible to a driver and a passenger when an LCD device of the embodiment of the present invention is used as an information display device of a vehicle.

An LCD device in the 'comparative example' shown in FIG. 9 is a general LCD device and does not include the viewing angle adjustment sheet 300 of the present invention ('embodiment' shown in FIG. 9).

Referring to FIG. 9, in the comparative example, most of the output light is concentrated around a center portion, and a narrow angle is made.

In the embodiment of the present invention using the viewing angle adjustment sheet 300, when the viewing angle adjustment sheet 300 is in an ON mode, substantially no viewing angle adjustment is produced, and thus a narrow viewing angle is made like the comparative example.

When the viewing angle adjustment sheet 300 is in an OFF mode, a viewing angle adjustment is produced, and thus a viewing angle in a horizontal direction in a state that the LCD device 10 of this embodiment is installed in a vehicle state increases.

Referring to FIG. 10, in a case that two display regions, i.e., first and second display regions D1 and D2 are defined in the LCD display 10 as an information display device, a navigation image and a moving image are displayed from the first display region D1 and the second display region D2, respectively.

While driving, a first division region A1 of the viewing angle adjustment sheet 300 corresponding to the first display region D1 is in an OFF mode, and a second division region A2 of the viewing angle adjustment sheet 300 corresponding to the second display region D2 is in an ON mode.

In this state (i.e., the driving state), all of the images from the first and second display regions D1 and D2 are visible to a passenger. On the other hand, the navigation image from the first display region D1 of a viewing angle widened is visible to a driver while the moving image from the second display region D2 of a narrow viewing angle is not visible to the driver.

When the vehicle is stopped, the first and second division regions A1 and A2 are all in an OFF mode.

In this state (i.e., the stopped state), the images from both the first and second display regions D1 and D2 of viewing angles widened are visible to the driver. All of the images from the first and second display regions D1 and D2 are also visible to the passenger.

In the above embodiment, the viewing angle adjustment unit is located between the liquid crystal panel and the backlight unit, and the viewing angle adjustment unit includes the viewing angle adjustment sheet to adjust a viewing angle by region.

Accordingly, when information images are displayed through the LCD device of the present invention as an information display device of a vehicle, a visibility of a driver for an information image for a passenger can be adjusted according to vehicle operation states. Thus, a dangerous factor while the driver is driving the car or while the car is moving can be removed.

The viewing angle adjustment unit includes a viewing angle control sheet to control a viewing angle in a horizontal or vertical direction.

Accordingly, an image reflection on a passenger side glass or a front glass of a vehicle can be reduced.

The LCD device of the present invention may be applied as various types of information display devices, including a vehicle information display device or as a display in any transportation device/system.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   a liquid crystal panel including a plurality of display regions arranged in a first axis direction, the plurality of display regions individually displaying a plurality of full images;
   a backlight unit below the liquid crystal panel; and
   a viewing angle adjustment unit between the liquid crystal panel and the backlight unit,
   wherein the viewing angle adjustment unit includes a viewing angle adjustment sheet that includes a plurality of division regions corresponding to the plurality of display regions, respectively,
   wherein the plurality of division regions are configured to be individually adjusted in scattering rate according to ON and OFF operation modes,
   wherein the viewing angle adjustment unit includes a second viewing angle control sheet on the viewing angle adjustment sheet, and the second viewing angle control sheet includes a plurality of second viewing angle control patterns each extending along the first axis direction, and
   wherein the viewing angle adjustment unit further includes a first viewing angle control sheet below the viewing angle adjustment sheet, and the first viewing angle control sheet includes a plurality of first viewing angle control patterns each extending along a second axis direction.

2. The LCD device of claim 1, wherein the viewing angle adjustment sheet includes:
   a liquid crystal layer including liquid crystal molecules dispersed in a polymer matrix; and
   first and second driving electrodes between which the liquid crystal layer is located,
   wherein at least one of the first and second driving electrodes includes a plurality of division electrodes corresponding to the plurality of division regions, respectively.

3. The LCD device of claim 2, wherein one of the first and second driving electrodes includes the plurality of division electrodes corresponding to the plurality of division regions, respectively, and the other one of the first and second driving electrodes corresponds to the plurality of division regions.

4. The LCD device of claim 2, wherein each division region is in the ON and OFF operation modes by switching on and off supplying a voltage to the corresponding division electrode.

5. The LCD device of claim 4, wherein each division region has a higher scattering rate in the OFF operation mode than in the ON operation mode.

6. The LCD device of claim 1, wherein each of the plurality of division regions faces only the corresponding display region.

7. The LCD device of claim 1, wherein the backlight unit includes a light guide plate, and at least one optical film between the light guide plate and the viewing angle adjustment unit.

8. A liquid crystal display (LCD) device, comprising:
   a liquid crystal panel including a plurality of display regions arranged in a first axis direction, the plurality of display regions individually displaying a plurality of full images;
   a backlight unit below the liquid crystal panel; and a viewing angle adjustment unit between the liquid crystal panel and the backlight unit;

wherein the viewing angle adjustment unit includes a viewing angle adjustment sheet that includes a plurality of division regions corresponding to the plurality of display regions, respectively, and that includes a liquid crystal layer including liquid crystal molecules dispersed in a polymer matrix, and first and second driving electrodes between which the liquid crystal layer is located, wherein at least one of the first and second driving electrodes includes a plurality of division electrodes corresponding to the plurality of division regions, respectively, wherein the viewing angle adjustment unit includes a second viewing angle control sheet on the viewing angle adjustment sheet, and the second viewing angle control sheet includes a plurality of second viewing angle control patterns each extending along the first axis direction, and wherein the viewing angle adjustment unit includes a first viewing angle control sheet below the viewing angle adjustment sheet, and the first viewing angle control sheet includes a plurality of first viewing angle control patterns each extending along a second axis direction.

9. The LCD device of claim 8, wherein one of the first and second driving electrodes includes the plurality of division electrodes corresponding to the plurality of division regions, respectively, and the other one of the first and second driving electrodes corresponds to the plurality of division regions.

10. The LCD device of claim 9, wherein each division region is in the ON and OFF operation modes by switching on and off supplying a voltage to the corresponding division electrode.

11. The LCD device of claim 10, wherein each division region has a higher scattering rate in the OFF operation mode than in the ON operation mode.

12. The LCD device of claim 8, wherein each of the plurality of division regions faces only the corresponding display region.

13. The LCD device of claim 8, wherein the backlight unit includes a light guide plate, and at least one optical film between the light guide plate and the viewing angle adjustment unit.

* * * * *